United States Patent [19]

Cable et al.

[11] Patent Number: 5,445,903

[45] Date of Patent: Aug. 29, 1995

[54] ELECTROCHEMICAL APPARATUS

[75] Inventors: Thomas L. Cable, Newbury; Michael A. Petrik, Highland Hts., both of Ohio

[73] Assignee: Technology Management, Inc., Cleveland, Ohio

[21] Appl. No.: 118,524

[22] Filed: Sep. 9, 1993

[51] Int. Cl.$^6$ .................................... H01M 8/10
[52] U.S. Cl. ................................ 429/33; 429/34; 429/35; 429/218
[58] Field of Search ............... 429/33, 34, 35, 218, 429/31, 32, 38, 39

[56] References Cited

U.S. PATENT DOCUMENTS

| | | | |
|---|---|---|---|
| 3,578,502 | 5/1971 | Tannenberger et al. | 136/120 |
| 4,088,501 | 5/1978 | Ellis et al. | 106/52 |
| 4,317,865 | 3/1982 | Trocciola et al. | 429/41 |
| 4,331,565 | 5/1982 | Schaefer et al. | 252/462 |
| 4,476,246 | 10/1984 | Kim et al. | 502/304 |
| 4,490,444 | 12/1984 | Isenberg | 429/31 |
| 4,517,260 | 5/1985 | Mitsuda | 429/41 |
| 4,547,437 | 10/1985 | Isenberg et al. | 429/30 |
| 4,582,766 | 4/1986 | Isenberg et al. | 429/30 |
| 4,590,090 | 5/1986 | Siemers et al. | 427/34 |
| 4,597,170 | 7/1986 | Isenberg | 29/623.5 |
| 4,598,467 | 7/1986 | Isenberg et al. | 29/623.5 |
| 4,702,971 | 10/1987 | Isenberg | 429/31 |
| 4,770,955 | 9/1988 | Ruhl | 429/33 |
| 4,812,329 | 3/1989 | Isenberg | 427/115 |
| 5,028,036 | 7/1991 | Sane et al. | 266/227 |
| 5,177,035 | 1/1993 | Gee et al. | 501/82 |
| 5,240,480 | 8/1993 | Thorogood et al. | 96/55 |
| 5,277,995 | 1/1994 | Ruka et al. | 429/31 |

FOREIGN PATENT DOCUMENTS

0399833A1 11/1990 European Pat. Off. .

OTHER PUBLICATIONS

Tuller et al, "Doped Ceria as a Solid Oxide Electrolyte" J. Electrochem. Soc, vol. 122, No. 2, pp. 255–259, 1975 No Month Presently Available.

Singhal et al., "Anode Development for Solid Oxide Fuel Cells" Report to the US Department of Energy, Dec. 1986.

*Primary Examiner*—John Niebling
*Assistant Examiner*—Bruce F. Bell
*Attorney, Agent, or Firm*—Renner, Kenner, Greive, Bobak, Taylor & Weber

[57] ABSTRACT

The electrical performance of an electrochemical apparatus such as a fuel cell and the durability of the fuel cell elements can be significantly enhanced and extended by the addition of an element between at least one electrode (the oxygen electrode and/or the fuel electrode) and the electrolyte. Performance can be additionally enhanced by the design of at least one electrode to alter its flow characteristics. An integrated separator element can additionally function as at least one electrode of the fuel cell.

22 Claims, 2 Drawing Sheets

ELECTROCHEMICAL APPARATUS

TECHNICAL FIELD

The present invention is directed to electrochemical generating apparatus such as solid electrolyte fuel cells and fuel cell assemblies for directly converting chemical energy into electricity. More particularly, it is directed to fuel cells comprising assembly elements having altered flow characteristics, resulting in surprisingly enhanced electrical performance.

BACKGROUND OF THE INVENTION

The invention is directed generally to electrochemical apparatus for the oxidation or consumption of a fuel and the generation of electricity, such as electrochemical reactors and molten salt or solid electrolyte fuel cells.

Although applicable to conventional cofired or tubular apparatus, the present invention is particularly useful when incorporated into solid oxide fuel cells, preferably noncofired and planar, that contain a stack of multiple assemblies. Each assembly comprises a solid electrolyte disposed between a cathode and an anode, being bounded by separators which contact the surfaces of the electrodes opposite the electrolyte. A fuel manifold and an air manifold pass gases through or over the assembly elements, with a gasket sealing the anode adjacent to the air manifold and a gasket sealing the cathode adjacent to the fuel manifold to minimize fuel and air mixing in a zone which would decrease cell voltage.

The fuel cell operates by the introduction of air into the cathode and the ionization of oxygen at the cathode/electrolyte surface. The oxygen ion moves across the gas-nonpermeable electrolyte to the anode interface, where it reacts with the fuel flowing into the anode, releasing heat and giving up its electron to the anode. The electron passes through the anode and separator to the next adjacent cathode.

Any clean hydogen- or hydrocarbon-containing fuel can be used in the electrochemical apparatus of the present invention, such as hydrogen, carbon monoxide, methane, natural gas, and reformed hydrocarbon fuels. The gas to be supplied to the cathode can be oxygen or an oxygen-containing gas such as air, $NO_x$, or $SO_x$.

The solid electrolyte surface may be coated or "painted" with an ink, or a thin layer of the composition that comprises the cathode, on the surface adjacent to the cathode, and with a nickel or nickel oxide ink (or other anode material) on the surface adjacent to the anode. The painted ink provides an environment for electrical conduction and in which the species can interact (molecular/ionic) or react (molecular/atomic).

A solid electrolyte fuel cell and assembly containing a plurality of fuel cells is disclosed in U.S. Pat. No. 4,770,955 to Ruhl, which is hereby incorporated by reference as if fully written out below. Ruhl discloses a fuel cell for oxidizing a fuel to produce electrical energy comprising the following elements.

—A plate-like, gas-impervious separator including a first internal hole passing through the first separator for receiving a gaseous fuel.
—A plate-like oxide powder cathode in contact with the first separator and including a second internal hole passing through the cathode for receiving a gaseous fuel, the second hole being in at least partial registration with the first hole.
—A plate-like, gas-impervious solid electrolyte in contact with the cathode and including a third internal hole passing through the electrolyte the third hole being in at least partial registration with the first hole.
—A substantially gas-impervious tubular gasket disposed within the second hole and sealingly contacting the electrolyte to protect the cathode from fuel within the first hole.
—A plate-like powder anode in contact with the solid electrolyte and including a fourth internal hole passing through the anode, the fourth hole being in at least partial registration with the first hole.

An embodiment of the Ruhl fuel cell is also disclosed in which the separator, cathode, electrolyte and anode, respectively include fifth, sixth, seventh and eighth holes for receiving an oxygen-bearing gas, the sixth, seventh, and eighth holes each being in at least partial registration with the fifth hole, and a substantially gas-impervious tubular gasket is disposed within the eighth hole and sealingly contacting the electrolyte to protect the anode from oxygen within the fifth hole.

The Ruhl fuel cell represents a significant step in the advancement of the art, being directed to non co-sintered elements which provide ease of fabrication as well as extended life due to the ability of the elements to accommodate their differing thermal expansion properties.

Cermet electrodes for solid oxide electrochemical fuel cells, preferably tubular in shape, are disclosed in U.S. Pat. No. 4,582,766 to Isenberg et at. Electronic conductors (metals) form the electrode and are bound to the electrolyte by a ceramic coating which is preferably the same material as the electrolyte. The metal electrode particles are oxidized and then reduced to form a porous metal layer which contacts both the ceramic coating and the metal electrode particles. The problems of ceramic-metal thermal expansion mismatch are not solved, and are indeed increased by the electrolyte/electrode bound structure. Further, the design of the electrode itself is not altered to provide an enhancement of flow characteristics across it.

SUMMARY OF THE INVENTION

We have found that both the electrical performance of an electrochemical apparatus such as a fuel cell and the durability of the fuel cell elements can be significantly enhanced and extended by the addition of an element between at least one electrode (the oxygen electrode and/or the fuel electrode) and the electrolyte according to the present invention. We have further found that performance can be additionally enhanced by the design of at least one electrode to alter its flow characteristics according to another embodiment of the invention. The ease of fabrication as well as the economics of production are increased by the present invention which also provides an integrated separator element that functions additionally as at least one electrode of the fuel cell.

The present invention is directed to an electrochemical apparatus such as a solid electrolyte fuel cell having a solid electrolyte disposed between an oxygen electrode and a fuel electrode, at least one separator contacting the surface of one of the electrodes opposite the electrolyte, and a reactive microslip zone disposed between the electrolyte and at least one electrode, wherein the reactive microslip zone has interconnected pores of a lesser average diameter than the pores of the adjacent electrode.

The present invention is further directed to an electrochemical apparatus such as a solid electrolyte fuel cell having a solid electrolyte disposed between an oxygen electrode and a fuel electrode in a cell, and at least one separator contacting the surface of one of the electrodes opposite the electrolyte, wherein at least one electrode has interconnected porosity sufficient to substantially eliminate backflow in the cell, said at least one electrode being contiguous to an electrical contact zone adjacent to the electrolyte.

The present invention is further directed to an electrochemical apparatus such as an assembly of at least two solid electrolyte fuel cells, each said fuel cell having a solid electrolyte disposed between an oxygen electrode and a fuel electrode, and wherein an integrated separator having an area of noncontinuous porosity between a first and a second area of continuous porosity is disposed between and in electrical contact with said at least two fuel cells.

The present invention is further directed to an electrochemical apparatus having at least one integrated separator adjacent to an electrolyte, wherein the integrated separator comprises at least one highly porous gas manifold section of interconnected porosity disposed proximate to the electrolyte, and a gas impervious section.

DETAILED DESCRIPTION OF THE INVENTION

Figure 1:
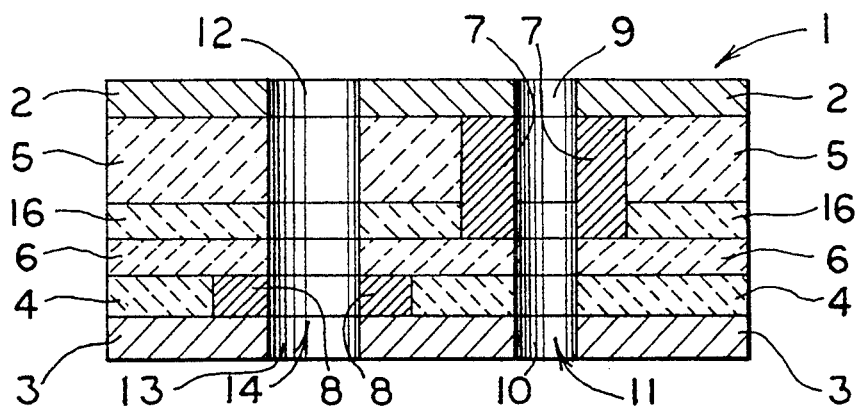
FIG. 1 is a sectional side view of a single fuel cell having a reactive microslip zone in communication with one electrode according to an embodiment of the invention.

Although applicable to other types of electrochemical apparatus, for purposes of this description the invention will be described in relation to its incorporation into a solid electrolyte (oxide) fuel cell. The fuel cell of one embodiment of the present invention is represented in FIG. 1, being a cross-sectional view of fuel cell 1. Fuel cell 1 includes two opposed separators 2 and 3, one of which contacts a fuel electrode or anode 4, and the other of which contacts an oxygen electrode or cathode 5, on their surfaces opposite an intervening electrolyte 6. Tubular gasket 7 forms a seal between separator 2 and electrolyte 6 to protect the cathode from fuel. Tubular gasket 8 forms a seal between separator 3 and electrolyte 6 to protect the anode from oxygen.

In this embodiment, separators 2 and 3 are both impervious to gases and are good electronic conductors. Separators 2 and 3 are preferably identical in construction so that a number of fuel cells 1 can be readily stacked upon each other to establish series electrical connections between adjacent stacked cells. In an assembly containing two or more cells, separator 2 of one cell can function as separator 3 of its contiguous cell, contacting on one surface a cathode and on its opposing surface, an anode.

Separators 2 and 3 contain first internal openings 9 and 10, respectively, which are preferably located so that they may be placed in registration with each other. Cathode 5 and anode 4 and electrolyte 6 of the fuel cell also include internal openings registerable with holes 9 and 10 so that a first internal tubelike passage 11 passing though the fuel cell may be formed for receiving a gaseous fuel.

Gasket 7 also forms a part of the inside surface of tubelike passage 11, providing substantially gas fight seals with separators 2 and electrolyte 6 so that fuel in passage 11 cannot directly contact cathode 5. Gasket 7 must remain impervious to fuel at the relatively high operating temperature of cell 1 and be capable of maintaining a good seal under cell operating conditions. Suitable gaskets can be made from oxidation resistant metal alloys such as nickel-base alloys, from ceramics or from glasses having suitable softening temperatures.

Separators 2 and 3 also contain second internal openings 12 and 13, respectively, that are disposed so that they may be placed in registration with each other. Each of anode 4, cathode 5 and intervening electrolyte 6 also includes a second internal opening registerable with holes 12 and 13 to form a second internal tubelike passage 14 passing through the fuel cell for receiving an oxygen-containing gas. It is within the scope of the invention to include multiple fuel passages 11 and/or oxygen passages 14 in various locations within the cell, preferably close to the centerline of the cell.

Gasket 8 is disposed between separator 3 and electrolyte 6 to form substantially gas-tight seals to protect anode 4 from oxygen within passage 14. Gasket 8 forms part of the inside surface of passage 14. Gasket 8 is preferably made of the same material as gasket 7. Separators 2, 3 may be made of a high temperature metallic alloy such as stainless steel (type 330), or of an oxide such as doped lanthanum chromite (LaCrO$_3$), and may be about 0.2 mm thick.

Cathode 5 is a porous body having a thickness in the range of about 0.5 mm–2.0 cm, preferably an oxide having the perovskite crystalline form such as strontium doped lanthanum manganite (LaMnO3), and doped calcium manganite (CaMnO$_3$), lanthanum chromite (LaCrO$_3$), lanthanum cobaltite, (LaCoO$_3$), lanthanum nickelite (LaNiO$_3$), lanthanum ferrite (LaFeO$_3$), or mixtures thereof. The cathode may comprise mixed ionic/electronic conductors such as appropriate doped perovskite oxides listed above. The cathode is prepared by conventional ceramic processing procedures, including pressing a powder, or extruding or tape casting a green body and sintefing, either prior to or during the initial operation of the apparatus.

Electrolyte 6 is a thin wafer, less than about 0.3 mm thick, preferably about 0.1 mm or less. Representative electrolytes include zirconia (ZrO$_2$) stabilized with 8 to 10 mole percent of yttria (Y$_2$O$_3$), doped cerium oxide, doped bismuth oxide, and oxide ion conducting perovskites such as doped BaCeO$_3$. Electrolyte 6 is substantially impervious to gases, however, ionized oxygen can migrate through the electrolyte under the influence of an applied oxygen potential.

The quality of the electrical contact between the cathode 5 and the electrolyte 6 may be improved by initially applying a thin layer of substantially the material that comprises the cathode (or is at least electrochemically compatible with the cathode) to the surface of the electrolyte 6 adjacent the cathode in the form of a paint or ink including a volatile vehicle to form an electrical contact zone. Likewise, a paint or ink containing substantially anode material such as nickel or nickel oxide may be applied to the surface of the electrolyte adjacent the anode to form such an electrical contact zone. This electrolyte surface coating may be applied by other conventional techniques also, such as plasma deposition, spin casting, spraying or screen printing.

The thickness of the electrolyte surface coatings is generally on the order of about 1 to less than about 100 microns, and preferably less than 50 microns. It has been found that the thicker this surface coating is applied, the less gas is able to contact the electrolyte, and the more tendency there is for the coating to peel off into the cavities of the electrode pores. Unless specifically stated to the contrary, the electrolyte as mentioned in this Specification shall mean the electrolyte with or without either or both cathode and anode material surface coatings.

Anode 4 is a porous body, and may comprise a finely divided, compressed metallic powder such as nickel or cobalt blended with a stable oxide powder such as zirconia, ceria, yttria or doped ceria. As described above regarding the cathode, the anode may comprise a mixed conductor, optionally combined with an electronically conducting material. Other examples include ceria or uranium oxide which can be doped with an oxide of lanthanum, zirconium or thorium, optionally containing an electronically conducting phase such as Co, Ru, or Pt. The thickness of the anode is preferably about 0.1 mm to about 0.5 mm in thickness. Like cathode 5, anode 4 may be sintered during cell operation or before initial operation in an overheating sintering step.

In order to begin operation of the electrochemical apparatus, the fuel cells are heated by an outside heat source to near their operating temperature. Once the reaction is initiated, it sustains itself by producing sufficient heat to support the ongoing cell operations. At the same time, an electrical current flows between separators 2 and 3 by virtue of the oxygen ionization and neutralization within each cell. This electrical current, driven by the oxygen potential difference, is the electrical output energy. The preferred operating temperature is close to about 1000° C. In order to produce useful quantities of electricity having a useful voltage, fuel cells of the type shown in FIG. 1 are typically arranged in a series connected stack. Because each of the fuel cells is so thin, hundreds of cells can be assembled in a single stack of reasonable physical size.

We have discovered that a significant improvement in the apparatus physical durability and the current established by the cell is realized by the interposition of a reactive microslip zone 16 between the painted electrolyte 6 and the bulk oxygen electrode (cathode 5). In a preferred mode, the reactive microslip zone 16 is made of a high density, tightly packed integral body of particulate cathode material held together by a binder and is characterized by small pores, although it is more porous than the painted ink interfacial layer coating of the electrolyte.

Similarly, we have found that a significant improvement in the apparatus physical durability and the current established by the cell is realized by the interposition of a reactive microslip zone between the painted electrolyte 6 and the bulk fuel electrode (anode 4). In a preferred mode, the reactive microslip zone contacting the anode is made of a high density, tightly packed integral body of particulate anode material held together by a binder and is characterized by small pores, although it is more porous than the painted ink interfacial layer coating of the electrolyte.

Figure 2:
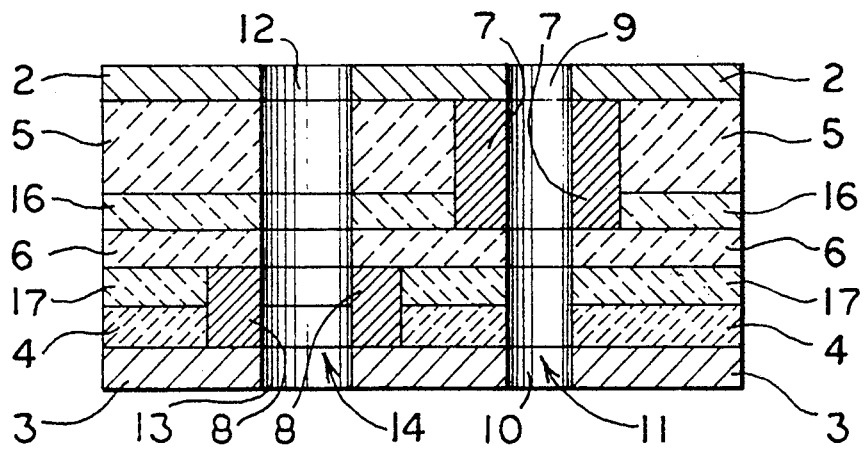
FIG. 2 is a sectional side view of a single fuel cell having a reactive microslip zone in communication with each electrode according to an embodiment of the invention.

In a further preferred embodiment, as shown in FIG. 2, there is disposed between the electrolyte 6 and bulk cathode 5 a reactive microslip zone 16, and disposed between the electrolyte 6 and the bulk anode 4 a reactive microslip zone 17. The reactive microslip zone may be either an integral member as described above, or alternatively a layer continuous with the bulk electrode. The reactive microslip layers 16, 17 described above may also be layers continuous with the bulk electrodes 5, 4 respectively. In either mode, continuous layer or integral member, the porosity of the reactive microslip zone may be graded in the degree of porosity, or in the size of the pores relative to the larger pored adjacent bulk electrode.

While it is preferred that the reactive microslip zones 16 and 17 be made of substantially the same material as the adjacent electrode 5 and 4, the cell benefits from the inclusion of the reactive microslip zone(s) so long as they are made of a material electrochemically compatible with the adjacent electrode(s).

The reactive microslip zone 16, 17 is a porous transition layer which allows the diffusion of gas molecules to the electrolyte surface, acts as a mechanical "shock absorber" for cell thermal and mechanical expansion, and is dense enough to provide an excellent electrical contact zone so as to act as the electrical bus to or from the reaction zone. The bulk electrodes 4, 5 may become gas distributors made of large, coarse particles or small particles having large pores in the structure, serving additionally as an electrical bus. As described above, a porosity gradient may be advantageously established across the electrode and the reactive microslip zone which would also make the present invention further applicable to tubular electrodes.

One problem that exists with known fuel cells is that in thermal cycles, such as occurs during heat up and cool down at the beginning and end of operating cycles, there is a physical degradation of the fuel cell elements because of differential movement due to thermal expansion mismatches of the different elements. For example, the paint or ink interface layers that may be coated on the electrolyte surfaces abrade against and into the pores of the electrodes. The reactive microslip zones 16, 17 prevent peeling of the painted interface layers or ink while providing enhanced electrical conduction as an intermediate electrical distribution bus between electrode 4,5 and electrolyte 6.

The reactive microslip zone also provides "microslip", or slight, nondetrimental shifting between the adjacent elements in response to mechanical forces, such as thermal expansion between the elements, acting as a mechanical stress reducer like a shock absorber for compressive movement and a bearing for transaxial movement, while at the same time retaining electrical contact. Further, the reactive microslip zone can deform or extrude to move in horizontal or vertical directions, particularly during cell initialization, in order to accommodate and distribute stresses within the cell and prevent fracturing of the electrolyte.

Because the reactive microslip zones 16, 17 have a smaller diameter porosity than the contiguous electrodes, there is an increase in the contact area between the electrode materials comprising the reactive microslip zones and the electrolyte, increasing electrical conduction at the interfaces and increasing the number of active sites where oxygen molecules can interact with electrons yielded by the electrolyte to form oxygen ions at or near the electrolyte surface proximate to cathode 6, and fuel molecules can react with oxygen ions at or near the opposite electrolyte surface, proximate to the anode 5.

In a preferred mode, the reactive microslip zone comprises a mixed conductor material, such that, for example, oxygen ions can form throughout the zone by the ionization reaction taking place within the zone rather than only at its interface with the electrolyte, dramatically increasing the number of active sites.

The improvement in the current established by the cell having the reactive microslip zone is on the order of about 350% to 500%, increasing from 3 amps up to about 15 amps in test cells. Current densities up to about 800 mA/cm$^2$ and power densities of up to 430 mW/cm$^2$ have been achieved at high fuel utilization.

The reactive microslip zone can be made by prefabrication as well as in situ processing by standard ceramic techniques. The zone can be tape cast with a binder such as a thermoset or thermoplastic binder, coextruded or co-calendared, or can be screen printed or deposited by plasma spray techniques. Whether the reactive microslip zone comprises a separate, integral member within the fuel cell or is continuous with its adjacent bulk electrode depends upon the fabrication technique. The reactive microslip zone is preferably about 50 microns to 200 microns thick.

The reactive microslip zones differ from the painted "ink" interfaces at the electrolyte surfaces in that each comprises a robust layer or zone, capable of uniform fabrication, resiliency, and dimensional control in the variability of thickness so as to be able to relieve mechanical stress within the cell. In the embodiment in which the reactive microslip zone comprises an integral member, the handleability and mechanical buffering value of the integral reactive microslip zone member in the green state improves cell assembly procedures as well as the operation of the finished cell. The integral member can mold itself to conform to adjacent cell elements in response to the mechanical forces present in the cell.

The reactive microslip zone, as well as the adjacent or continuous bulk electrode are preferably fabricated to form a gradient in porosity. It is the preferred morphology to provide the smallest particle sizes and smallest pores at the surface where reaction is to occur, such as near the surface of the electrolyte, in order to provide the largest amount of particles and active sites in contact with the zirconia of the electrolyte. Use of a gradient, however, with larger particle sizes and larger porosity leading up to the smaller pored portion, permits more gas to be provided to the reaction area initially. It is important that the porosity provided in the electrode and microslip zone be interconnected porosity so as to permit the flow of gas through the layers.

In one embodiment of the invention, at least one electrode such as the oxygen electrode (cathode 5) and either alternatively or additionally the fuel electrode (anode 4) are provided as enhanced gas manifolds for gas distribution to active reaction sites. The electrodes are formed to function as gas manifolds by the use of pore formers, providing a fixed interconnected porosity sufficient to substantially eliminate backflow of gases within the cell.

The porosity of the electrodes are preferably in the range of about greater than 50% to about 90%, as measured by mercury porosimetry, and more preferably is greater than about 70%. The pressure drop across the electrodes is generally to be kept within the range of about 2 psi/inch of electrode, and most preferably is about 1 psi/inch. Prior art fuel cells utilizing particulate electrodes typically exhibit pressure drops of 20 psi or greater. Fixed interconnection of the porosity is important to provide an unimpeded path for the gas flow.

The interconnected porosity of the enhanced gas flow electrode can be made by the preparation of a ceramic green body of precursers to the electrode material into which green body has been incorporated a thermoset or thermoplastic binder and a pore former such as wax or a salt, for example calcium chloride. After the formation of the green body, the pore former is dissolved out of the green body by heating or by immersion in a solvent for the pore former, leaving an interconnected pathway of voids in the material which can then be fired by conventional procedures. A method for forming interconnected porosity in a ceramic body is disclosed in U.S. Pat. No. 5,028,036, which is incorporated herein by reference as if fully written out below.

Alternate methods of forming the interconnected porosity within the electrode include the use of woven sintered ceramic fibers, or pressed ceramic particles. In the latter method, it is necessary to use particle sizes which are large, in the range of about 40 mesh to 80 mesh (0.177-0.42 mm), and in which there are not a significant amount of smaller sized particles present, which could block the pores between the larger particles. Where particulate electrodes are used, interconnected porosity can still be considered to be fixed if the particle size range is such that small particles do not block pores, and the shifting of large particles into a pore or a passageway between pores creates a shifted void that reestablishes an interconnection to the same or another pore.

In a method related to the pore forming method, a reticulated foam is used as a substrate for the deposition of electrode material to form a precurser, and then the foam is dissolved to form the interconnected pores.

The enhanced porosity oxygen electrode can be made out of conventional sintered ceramic cathode materials disclosed above such as strontium doped lanthanum manganite. The enhanced porosity fuel electrode can be made out of conventional anode materials or metals disclosed above such as nickel or cobalt cermets, for example, nickel zirconia. An enhanced porosity electrode is incorporated into the cell to provide both gas distribution and electrical conductivity. The amount of void space in the electrode should not be so great as to limit the reaction because of a lack of electrically conductive pathways or electrical contact to the adjacent cell elements. A balance is therefore preferable between the lack of gas pressure drop and the conductivity of the electrode.

It is preferred that the enhanced porosity electrode not contact the electrolyte directly because of the possibility of decreased electrical contact with the electrolyte surface. An electrical contact zone of lesser porosity, such as obtained with the electrolyte "ink" layer coating or a reactive microslip zone would provide the necessary conductivity to operate in desired electrical performance ranges. In one embodiment, the porosity of the enhanced porosity electrode is graded such that the smaller pore sizes occur in the area of the electrolyte interface.

Figure 3:
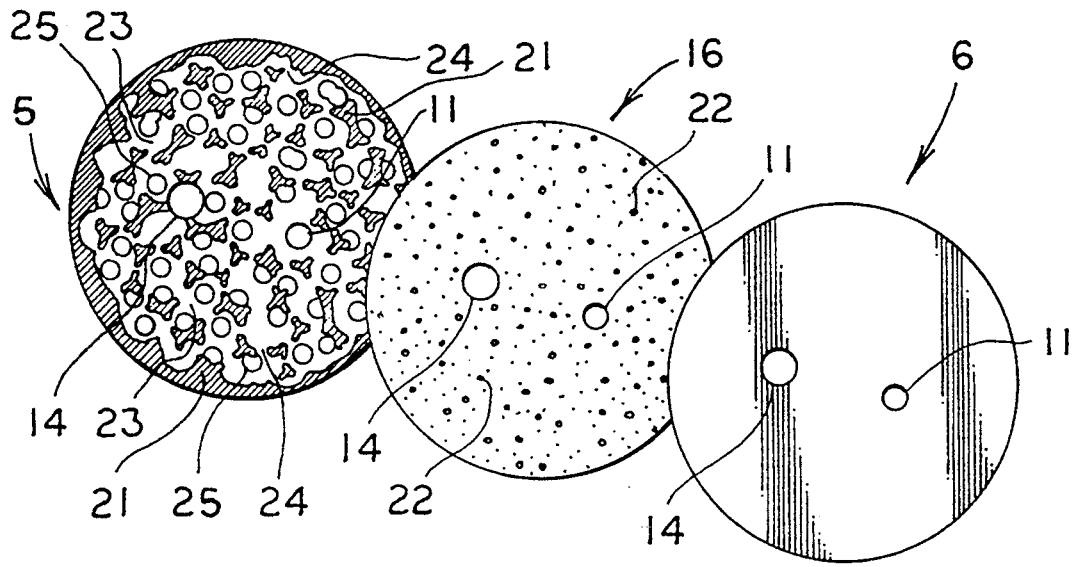
FIG. 3 is a an exploded plan view of a portion of a fuel cell showing a porosity enhanced electrode, a reactive microslip zone member and an electrolyte, according to an embodiment of the invention.

Referring to FIG. 3, a preferred embodiment of the invention is shown in an exploded plan view in which an enhanced porosity planar oxygen electrode (cathode 5) is contiguous to a reactive microslip zone 16 that contacts the electrolyte 6 on its opposite surface. Contained within these elements are fuel passage 11 manifold and oxygen passage 14 manifold which supply gases to the electrodes (anode not shown for clarity). Small pores 22 are present in the reactive microslip zone 16 for the passage of species to the electrolyte 6.

Cathode 5 as shown comprises a substantially dense matrix 21 in which are located large pores 23, which generally assume the shape of the pore former whose removal left the pore 23 voids. In the case of spherical pore formers, the voids left will be generally round, oval or elliptical in shape. Pores 23 are interconnected to other pores within cathode 5 in the plane of the cutaway plan view by horizontal passages 24. Pores 23 are interconnected to other pores within cathode 5 in the planes above and below the cutaway plan view by vertical passages 25. The matrix 21 fills the spaces in the planes above and below the plane of the cutaway plan view that are not occupied by pores or passages.

Although the enhanced flow electrode can be utilized in the electrochemical apparatus without a contiguous reactive microslip zone, the reactive microslip zone serves to provide enhanced electrical distribution by its greater conductor contact area to the surface of the electrolyte. Additionally, the reactive microslip zone protects the surface of the electrolyte, and any paint or ink interface layer that may be disposed thereon, from the void containing electrode surface. The enhanced flow cathode 5 enhances performance of the apparatus by facilitating gas distribution and oxygen permeability through the electrode.

In an embodiment of the invention, an integrated component can act as a current collector, gas manifold and cell separator. The integrated separator has at least one highly porous gas manifold section comprising an area of interconnected porosity adjacent to a gas impervious section comprising a dense portion or an area of discontinuous porosity which provides the separator function. The integrated separator is made of a ceramic electrode material such as yttrium chromite, or a metal, and must be conductive.

The integrated separator can replace either the separator and one adjacent electrode in one fuel cell, or the separator and both adjacent electrodes in an assembly of two adjacent fuel cells. The integrated separator provides the electrical contact and the physical separation between two fuel cells, and provides the gas distribution function of at least one adjacent electrode (fuel and/or oxygen). An enhanced reaction surface can be provided by a reactive microslip zone(s) contactingly disposed adjacent to the porous surface(s) and the electrolyte.

The integrated separator can be fabricated by co-calendaring at least one layer of interconnected porosity and a dense or noninterconnected porous layer. Alternatively, the integrated separator can be made from an interconnectedly porous body by a retrofill technique.

Figure 4:
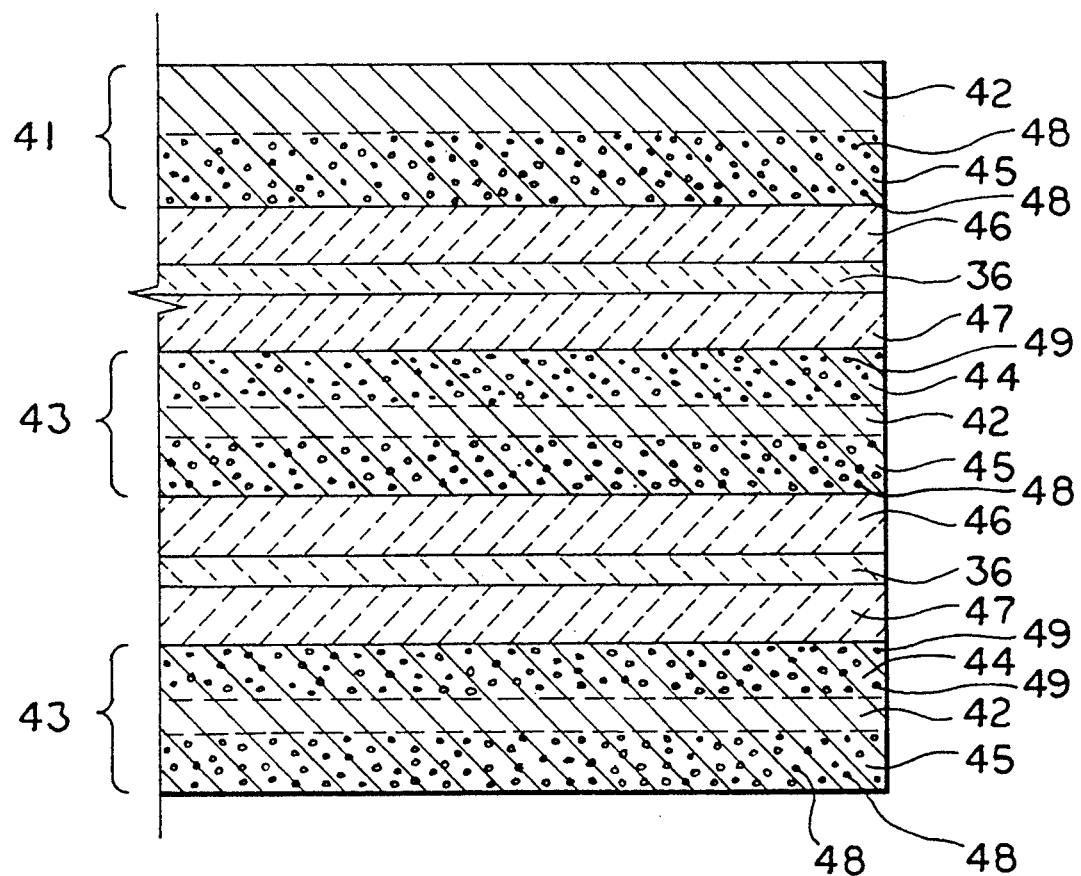
FIG. 4 is a sectional side view of a cutaway portion of an assembly of two fuel cells having an integrated separator according to an embodiment of the invention.

Referring to FIG. 4, terminal integrated separator 41 comprises a gas impervious section 42 of dense material or material of noncontinuous porosity, and a gas manifold section 45 which may function as an oxygen electrode. While integrated separator 41 is shown as the terminal contact of the stacked series of cells, an integrated separator of this configuration, having only one gas manifold area of continuous porosity, may be used in other cells in the stack with an opposed counterelectrode. Gas manifold section 45 in the depicted embodiment, containing pores 48, contacts an integral reactive microslip zone 46 made of material electrochemically compatible with the oxygen gas manifold section 45, disposed between the integrated separator 41 and a solid electrolyte 36.

An integrated separator 43 having a gas impervious central portion 42 is disposed on the opposite side of electrolyte 36, with gas manifold section 44, containing pores 49, serving as the fuel electrode, and contacting an integral reactive microslip zone 47 made of a material electrochemically compatible with the fuel gas manifold section 44. Electrolyte 36 may be coated with a compatible cathode type material adjacent to reactive microslip zone 46, and with a compatible anode type material adjacent to reactive microslip zone 47.

Preferably, the gas manifold sections 44, 45 are fabricated to provide enhanced interconnected porosity as described above. The relationship of pore size and porosity of the gas manifold sections 44, 45 to that of the reactive microslip zones 46, 47 may be advantageously structured as described above with regard to the embodiment depicted in FIG. 3.

EXAMPLES

Example A

Anode Compatible Integral Reactive Microslip Zone Fabrication

A slurry for tape casting was prepared by ball-milling a mix containing 37.3 g NiO (tradename Aesar) and 13.5 g Ni metal (tradename Inco 123) and 16.9 g of 8 mol yttria stabilized zirconia together with a binder mix. The binder consisted of 1.7 g Z3(tradename for Menhaden Fish Oil) as a 50 vol. % solution in toluene, 4.5 g polyvinylbutyrol (tradename Monsanto B79), 2.5 g butyl benzylphthalate (tradename Santicizer 1160) and 2.2 g corn oil. The solvent for the above system contained 18.0 g toluene, 8.0 g ethanol and 4.5 g methyl-ethyl ketone.

The mix was milled for 16–24 hours using cylindrical zirconia grinding media, after which it was decanted from the milling beads. The tape was then cast on a flexible carrier film, supported by a glass plate. A doctor blade gap setting of 10 to 25 mils resulted in a green tape of 2 to 5 mils. After drying for approximately 1 hour the flexible green tape was separated from the carrier film and cut into the desired shape.

Example B

Cathode Compatible Integral Reactive Microslip Zone

A tape casting slurry was prepared by ball-milling together 45.2 g of La.845r.15MnO$_3$ powder, 1.68 g of Z3 (tradename for Menhaden Fish Oil) as a 50 vol. % solution in toluene, 2.5 g butyl benzylphthalate (tradename Santicizer 160), 4.5 g polyvinylbutyrol (tradename Monsanto B79) and 2.2 g corn oil. The solvent carrier for the slurry was a mix of approximately 18 g toluene, 8 g ethanol and 4 g methyl ethyl ketone.

A uniform mix was accomplished by milling for 20 hours using cylindrical zirconia grinding media. The slurry was decanted from the grinding media and cast with a doctor blade gap setting of 20 mils onto a plastic carrier film. After drying approximately 1 hour the cast tape was separated from the plastic film and cut into shape.

TABLE I

| Run No. | Cell Elements |
| --- | --- |
| C1 | Reactive microslip member only-No bulk electrode or electrolyte ink layer. |
| C2 | Reactive microslip member only-No bulk electrode or electrolyte ink layer. |
| C3 | Bulk electrodes only no electrolyte "ink" layer or reactive microsup member. |
| C4 | Bulk electrodes only no electrolyte "ink" layer or reactive microslip member. |
| 5 | Bulk electrodes and electrolyte ink layer |
| 6 | Bulk electrodes and electrolyte ink layer |
| 7 | Bulk electrodes and electrolyte ink layer |
| 8 | Bulk electrodes and reactive microslip zone members |
| 9 | Bulk electrodes and reactive microslip zone members |
| 10 | Bulk electrodes electrolyte ink layer, reactive microslip zone members. |
| 11 | Bulk electrodes electrolyte ink layer, reactive microslip zone members. |
| 12 | Bulk electrodes electrolyte ink layer, reactive microslip zone members. |

TABLE II

| RUN NO. | $H_2$ Flow (cc/min) | $H_2$ BP* (psi) | Air Flow (cc/min) | Air BP* (psi) | Voltage (V) | Current (Amps) | Power (Watts) |
| --- | --- | --- | --- | --- | --- | --- | --- |
| C1 | 60 | 18.9 | 200 | 24.5 | 0.481 | 0.87 | 0.42 |
| C2 | 85 | 22.2 | 200 | 24.5 | 0.472 | 0.86 | 0.41 |
| C3 | 60 | 0 | 300 | 0 | 0.455 | 0.44 | 0.20 |
| C4 | 100 | 0 | 500 | 1.1 | 0.480 | 0.46 | 0.22 |
| 5 | 60 | 0 | 300 | 0.6 | 0.517 | 3.20 | 1.65 |
| 6 | 100 | 0 | 300 | 0.4 | 0.502 | 4.04 | 2.03 |
| 7 | 120 | 0 | 300 | 0.4 | 0.522 | 4.08 | 2.13 |
| 8 | 60 | 1.2 | 300 | 1.4 | 0.523 | 4.32 | 2.26 |
| 9 | 100 | 1.7 | 500 | 2.0 | 0.561 | 4.56 | 2.55 |
| 10 | 60 | 0 | 300 | 0 | 0.499 | 8.40 | 4.19 |
| 11 | 85 | 0 | 420 | 1.0 | 0.490 | 11.95 | 5.86 |
| 12 | 120 | 0 | 600 | 1.5 | 0.516 | 14.48 | 7.47 |

*BP = Back Pressure

Example A describes the preparation of a reactive microslip zone member for use adjacent a fuel electrode. Example B describes the preparation of a reactive microslip zone member for use adjacent to an oxygen electrode. These were tested in a solid electrolyte fuel cell, together with enhanced porosity bulk electrodes of the same composition as the adjacent reactive microslip zone member, prepared by tape casting according to the procedure set forth in the specification above to achieve 80% porosity by volume.

Table I lists the configuration of the test fuel cells run with air and hydrogen at various flow rates. The results of the test runs are listed in Table II.

In comparative examples C1 and C2, in which no bulk electrodes were utilized in the cell, the reactive microslip member served as the electrode, with no interfacial ink layer between the member and the electrolyte. Pressure drop across the members were very high, and higher flow rates could not be achieved due to the magnitude of the pressure drop. Power achieved was very low.

In comparative examples C3 and C4, high porosity bulk electrodes only were used as gas manifolds/electrodes, with no electrolyte interfacial ink layer or reactive microslip member. The pressure drops across the electrodes were practically zero or otherwise very low, however, the electrical contact with the electrolyte was such that very low power output was produced.

In examples 5-7, enhanced porosity electrodes were utilized as well as compatible electrolyte ink coating adjacent the electrodes. The pressure drops across the fuel electrode were practically zero, and across the oxygen electrode were less than 1 psi/inch of electrode. Current established and power realized from the cells were 5-10 times higher than the comparative cells.

In examples 8 and 9, enhanced porosity electrodes were utilized with reactive microslip zone members between the electrodes and the electrolyte (uncoated). Pressure drops across the electrodes was less than 2 psi/inch and both current and power increased relative to the comparative examples 1-4 and the examples 5-7.

In examples 10-12, cells utilizing the enhanced porosity electrodes reactive microslip zone members and compatible electrolyte ink coatings adjacent each enhanced porosity electrode resulted in pressure drops across the fuel electrode of practically zero and across the oxygen electrode of less than 1.5 psi/inch. The current and power output of these cells were surprisingly enhanced, with nearly 2 to 3 times the current and power performance of the best of the test runs of the previous examples.

The above examples demonstrate that the various embodiments of the present invention provide improved electrical performance of electrochemical apparatus. The various embodiments of the present invention provide lower pressure drops which improve gas distribution for better air utilization, decreasing requirements for high pressure blowers in the balance of systems; and, improve fuel distribution for higher fuel utilization and fuel efficiency.

It should be appreciated that the present invention is not limited to the specific embodiments described above, but includes variations, modifications and equivalent embodiments defined by the following claims.

We claim:

1. An electrochemical apparatus having a solid electrolyte disposed between an oxygen electrode and a fuel electrode, at least one separator contacting the surface of one of the electrodes opposite the electrolyte, and a reactive microslip zone disposed between the electrolyte and at least one electrode, wherein the reactive microslip zone has interconnected pores of a lesser average diameter than the pores of the adjacent electrode.

2. The electrochemical apparatus as in claim 1 wherein the reactive microslip zone is adjacent the oxygen electrode and comprises substantially the same material as the oxygen electrode.

3. The electrochemical apparatus as in claim 2 wherein the electrolyte has an oxygen electrode material coating on the electrolyte surface proximate to the oxygen electrode.

4. The electrochemical apparatus as in claim 1 wherein the reactive microslip zone is adjacent the fuel electrode and comprises substantially the same material as the fuel electrode.

5. The electrochemical apparatus as in claim 4 wherein the electrolyte has a fuel electrode material coating on the electrolyte surface proximate to the fuel electrode.

6. The electrochemical apparatus as in claim 1 wherein the reactive microslip zone comprises an integral member.

7. The electrochemical apparatus as in claim 1 having a first said reactive microslip zone disposed between the oxygen electrode and the electrolyte and a second said reactive microslip zone disposed between the fuel electrode and the electrolyte.

8. The electrochemical apparatus as in claim 1 comprising a planar solid electrolyte fuel cell.

9. A solid electrolyte electrochemical apparatus having a solid electrolyte disposed between an oxygen electrode and a fuel electrode in a cell, and at least one separator contacting the surface of one of the electrodes opposite the electrolyte, wherein at least one of the electrodes has enhanced, fixed interconnected porosity of greater than about 50% to about 90% to substantially eliminate gas backflow in the cell, said at least one electrode being contiguous to an electrical contact zone adjacent to the electrolyte.

10. The electrochemical apparatus as in claim 9 wherein the enhanced, fixed interconnected porosity comprises means for providing gas flow across said at least one electrode having a pressure drop less than about 2 psi/inch.

11. The electrochemical apparatus as in claim 9 wherein the electrolyte has an oxygen electrode material coating on the electrolyte surface proximate to the oxygen electrode and the electrolyte has a fuel electrode material coating on the electrolyte surface proximate to the fuel electrode.

12. The electrochemical apparatus as in claim 9 wherein both the oxygen electrode and the fuel electrode have said enhanced, fixed interconnected porosity.

13. A solid electrolyte electrochemical apparatus having a solid electrolyte disposed between an oxygen electrode and a fuel electrode in a cell, and at least one separator contacting the surface Of one of the electrodes opposite the electrolyte, wherein at least one of the electrodes has enhanced, fixed interconnected porosity of greater than about 50% to about 90% to substantially eliminate gas backflow in the cell, said at least one enhanced porosity electrode being contiguous to an electrical contact zone adjacent to the electrolyte, and having a reactive microslip zone disposed between the electrolyte and said at least one enhanced porosity electrode, wherein the reactive microslip zone has interconnected pores of a lesser average diameter than the pores of the enhanced porosity electrode.

14. The electrochemical apparatus as in claim 13 having a porosity gradient across the enhanced porosity electrode such that the smaller pore diameter portion of the enhanced porosity electrode is contiguous to the reactive microslip zone.

15. The electrochemical apparatus as in claim 13 wherein the reactive microslip zone comprises an integral member.

16. The electrochemical apparatus as in claim 12 wherein both the oxygen electrode and the fuel electrode have said enhanced, fixed interconnected porosity.

17. The electrochemical apparatus as in claim 16 having a first reactive microslip zone comprising substantially the same material as the oxygen electrode disposed between the oxygen electrode and the electrolyte, and a second reactive microslip zone comprising substantially the same material as the fuel electrode disposed between the fuel electrode and the electrolyte, wherein the first reactive microslip zone and the second reactive microslip zone have interconnected pores of a lesser average diameter than the pores of the adjacent enhanced porosity electrode.

18. The electrochemical apparatus as in claim 17 wherein the electrolyte has an oxygen electrode material coating on the electrolyte surface proximate to the oxygen electrode and the electrolyte has a fuel electrode material coating on the electrolyte surface proximate to the fuel electrode.

19. An assembly of at least two solid electrolyte fuel cells, each said fuel cell having a solid electrolyte disposed between an oxygen electrode and a fuel electrode, and wherein an integrated separator having an area of noncontinuous porosity between a first and a second area of continuous porosity is disposed between and is in electrical contact with said at least two fuel cells.

20. The assembly as in claim 19 wherein the integrated separator first area of continuous porosity forms an electrode of the first of the two fuel cells and the integrated separator second area of continuous porosity forms the counterelectrode of the second of the two fuel cells.

21. An assembly of at least two solid electrolyte fuel cells, each said fuel cell having a solid electrolyte disposed between an oxygen electrode and a fuel electrode, wherein an integrated separator having an area of noncontinuous porosity between a first and a second area of continuous porosity is disposed between and is in electrical contact with said at least two fuel cells, and wherein a reactive microslip zone is disposed between the electrolyte and at least one area of integrated separator continuous porosity.

22. An electrochemical apparatus having at least one integrated separator adjacent to an electrolyte, wherein the integrated separator comprises at least one highly porous gas manifold section of interconnected porosity disposed proximate to the electrolyte, and a gas impervious section.

* * * * *